(12) United States Patent
Allen et al.

(10) Patent No.: US 6,856,763 B2
(45) Date of Patent: Feb. 15, 2005

(54) DEPLOYMENT APPARATUS FOR CAMERAS AND OTHER HAND-HELD DEVICES AND DEPLOYMENT METHOD

(75) Inventors: Michael R. Allen, Churchville, NY (US); Anthony DiRisio, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/447,853

(22) Filed: May 29, 2003

(65) Prior Publication Data

US 2004/0240875 A1 Dec. 2, 2004

(51) Int. Cl.⁷ .............................................. G03B 17/00
(52) U.S. Cl. ........................... 396/72; 396/84; 396/349
(58) Field of Search ............................... 396/6, 72, 84, 396/349

(56) References Cited

U.S. PATENT DOCUMENTS 4,772,903 A * 9/1988 Labaziewicz ................ 396/84

* cited by examiner

Primary Examiner—David M. Gray
(74) Attorney, Agent, or Firm—Robert Luke Walker

(57) ABSTRACT

A hand-held device has a body and a deployable component mounted to the body. The deployable component is movable, with a deployment method, between undeployed and deployed positions. A drive unit is disposed within the body and engages the deployable component. The drive unit is reversibly pivotable about a drive axis from a first end orientation, through first and second ranges of intermediate orientations, to a second end orientation. An actuator that is mounted to the body is manually switchable, in forward and rearward strokes, between primary and secondary positions. The actuator at the forward stroke pivots the drive unit from the first end orientation to a second range intermediate orientation and at the rearward stroke pivots the drive unit from the second end orientation to a first range intermediate orientation. A drive over-center mechanism biases the drive unit to pivot from the second range intermediate orientations toward the second end orientation and from the first range intermediate orientations toward the first end orientation.

24 Claims, 13 Drawing Sheets

DEPLOYMENT APPARATUS FOR CAMERAS AND OTHER HAND-HELD DEVICES AND DEPLOYMENT METHOD

CROSS REFERENCE TO RELATED APPLICATIONS

Reference is made to commonly assigned, co-pending U.S. Pat. No. 6,711,349, entitled: CAMERA ASSEMBLY HAVING A TRAVELER AND PIVOTABLE TURRET DRIVEN BY AN OVER-CENTER MECHANISM, granted Mar. 23, 2004, in the name of Anthony DiRisio.

Reference is made to commonly assigned, co-pending U.S. Pat. No. 6,751,411, entitled: CAMERA ASSEMBLY HAVING TRAVEL STOP, granted Jun. 15, 2004, in the name of Anthony DiRisio.

Reference is made to commonly assigned, co-pending U.S. Pat. No. 6,757,490, entitled: CAMERA ASSEMBLY HAVING FORWARD AND RETURN CAM SURFACES FOR A TURRET ON DIFFERENT PARTS, granted Jun. 29, 2004, in the name of Anthony DiRisio.

Reference is made to commonly assigned, co-pending U.S. patent application Ser. No. 10/447,701, entitled: CAMERA ASSEMBLY HAVING COVERGLASS-LENS ADJUSTER, filed May 29, 2003, in the name of Wayne Stiehler.

Reference is made to commonly assigned, co-pending U.S. patent application Ser. No. 10/447,702, entitled: CAMERA ASSEMBLY HAVING OVER-CENTER BIASING OF TRAVELER AGAINST RESTS, filed May 29, 2003, in the name of Anthony DiRisio.

Reference is also made to commonly assigned, co-pending U.S. Pat. No. 6,741,400, entitled: MULTIPLE POSITION LENS BARREL HAVING CAM CYLINDER WITH COMMONLY BIASED FIRST AND SECOND LENS CARRIERS, granted May 25, 2004, in the name of Anthony DiRisio.

Reference is also made to commonly assigned, co-pending U.S. Pat. No. 6,687,457, entitled: CAMERA FRAME ASSEMBLY HAVING FOUR-BAR LINKAGE SHUTTER ACTUATOR, granted Feb. 3, 2004, in the name of Anthony DiRisio.

Reference is also made to commonly assigned, co-pending U.S. patent application Ser. No. 10/324,966, entitled: CAMERA LENS MODULE HAVING RECYCLABLE LENS BARREL CAP, filed Dec. 20, 2002, in the name of Anthony DiRisio.

Reference is also made to commonly assigned, co-pending U.S. patent application Ser. No. 10/327,503, entitled: EXTENDABLE LENS CAMERA HAVING MECHANICAL SHUTTER BLOCKING IN INTERMEDIATE LENS POSITION, filed Dec. 20, 2002, in the name of Anthony DiRisio.

Reference is also made to commonly assigned, co-pending U.S. Pat. No. 6,738,568, entitled: CAMERA FRAME ASSEMBLY HAVING SHUTTER THAT SLIDES FORWARD AND BACK WITH ZOOM LENS, granted May 18, 2004, in the name of Anthony DiRisio, David J. Cornell.

Reference is also made to commonly assigned, co-pending U.S. patent application Ser. No. 10/325,553, entitled: CAMERA FRAME ASSEMBLY HAVING SHUTTER ACTUATOR WITH TELESCOPING STRIKER AND METHOD, filed Dec. 20, 2002, in the name of David J. Cornell.

Reference is also made to commonly assigned, co-pending U.S. Pat. No. 6,640,053, entitled: CAMERA FRONT SEAL ASSEMBLY, Granted Oct. 28, 2003, in the name of Anthony DiRisio.

Reference is also made to commonly assigned, co-pending U.S. Pat. No. 6,786,657, entitled: CAMERA FRAME ASSEMBLY HAVING INDEPENDENTLY BACK-PIVOTING DRIVE HUB FOR IMPACT SHUTTER, granted Sep. 7, 2004, in the name of Anthony DiRisio, David J. Cornell.

FIELD OF THE INVENTION

The invention relates to cameras and other hand-held devices having deployable components and more particularly relates to a deployment apparatus for cameras and other hand-held devices and a deployment method.

BACKGROUND OF THE INVENTION

Cameras are known, in which a two position lens module is moved between positions by a slider and is biased toward one or the other position by an over-center mechanism. U.S. Pat. No. 6,449,430 discloses a one-time-use camera that switches between positions in this manner. U.S. Pat. No. 6,466,740 discloses a camera having a retracting-extending lens and a viewfinder mask. The mask and lens are moved in tandem by a slider. An over-center mechanism biases the lens and mask toward either of two opposed positions. U.S. Pat. No. 6,343,186 and U.S. Pat. No. 6,408,133 are similar. The available travel for the parts moved is a function of the distance moved by the slider. This constrains the functions of the parts moved by the slider.

It would thus be desirable to provide cameras and other hand-held devices having a deployment apparatusn and deployment methods, in which travel of deployed parts is not directly limited by the range of movement of a slider.

SUMMARY OF THE INVENTION

The invention is defined by the claims. The invention, in broader aspects, provides a hand-held device that has a body and a deployable component mounted to the body. The deployable component is movable, with a deployment method, between undeployed and deployed positions. A drive unit is disposed within the body and engages the deployable component. The drive unit is reversibly pivotable about a drive axis from a first end orientation, through first and second ranges of intermediate orientations, to a second end orientation. An actuator that is mounted to the body is manually switchable, in forward and rearward strokes, between primary and secondary positions. The actuator at the forward stroke pivots the drive unit from the first end orientation to a second range intermediate orientation and at the rearward stroke pivots the drive unit from the second end orientation to a first range intermediate orientation. A drive over-center mechanism biases the drive unit to pivot from the second range intermediate orientations toward the second end orientation and from the first range intermediate orientations toward the first end orientation.

It is an advantageous effect of the invention that improved cameras and other hand-held devices having a deployment apparatusn and deployment methods are provided, in which travel of deployed parts is not directly limited by the range of movement of a slider.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

The outer subunit of the actuator is shown by dashed lines.

Figure 1:
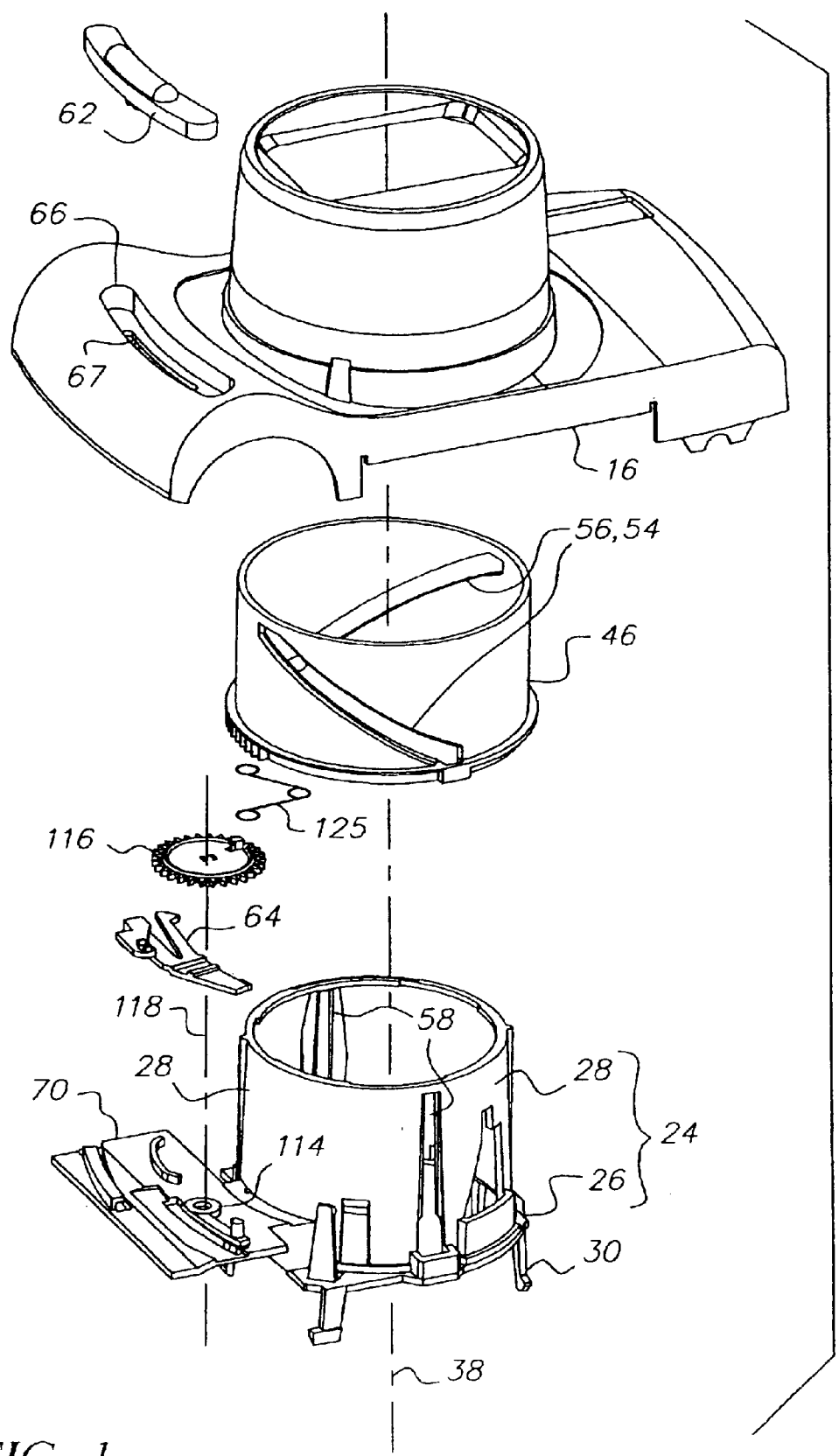
FIG. 1 is a simplified, exploded perspective view of an embodiment of a camera that includes the deployment apparatus. For clarity, only the support, twist ring, and front cover of the camera are shown.
Figure 2:
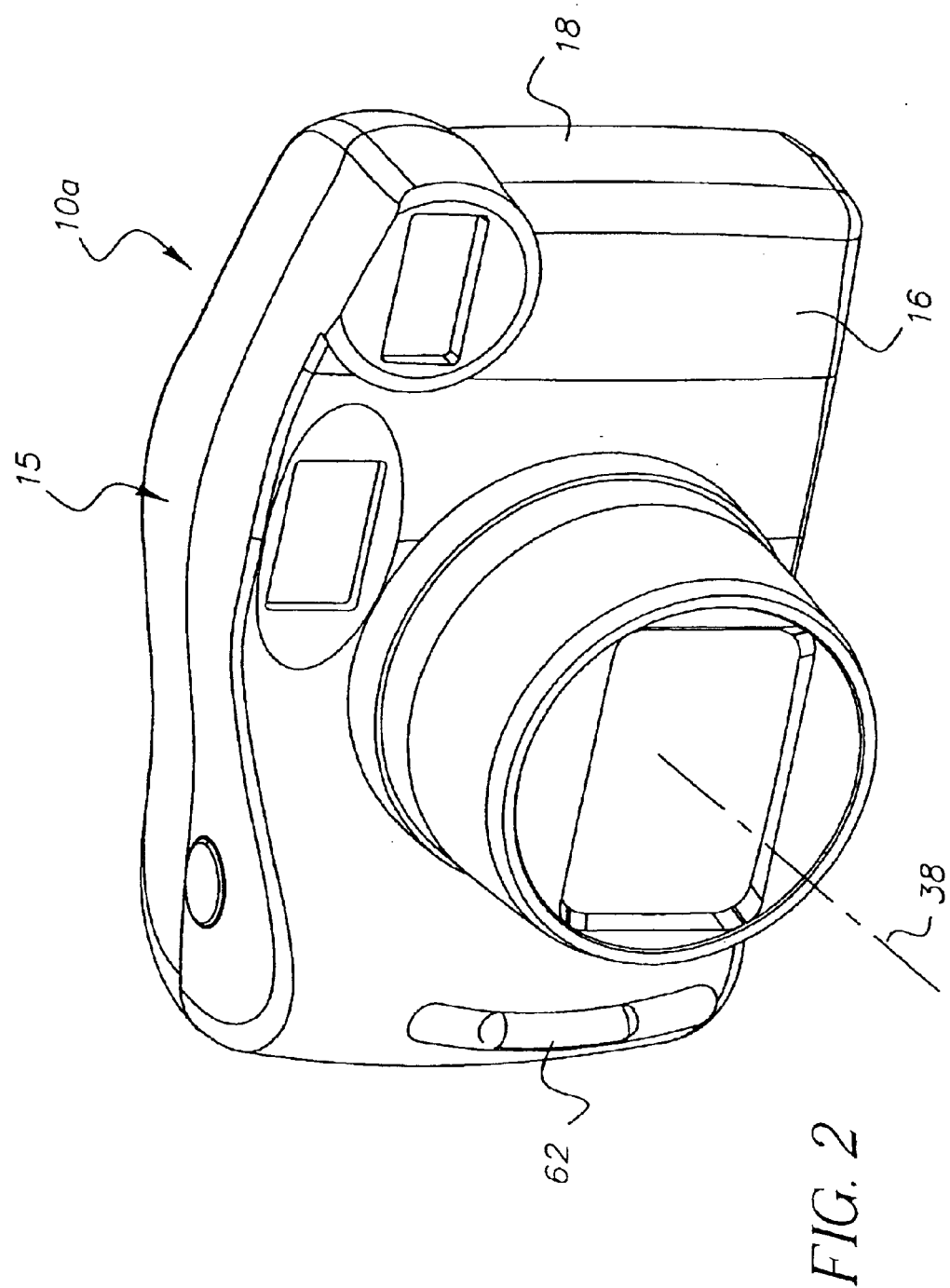
FIG. 2 is a front perspective view of the camera of FIG. 1.
Figure 3:
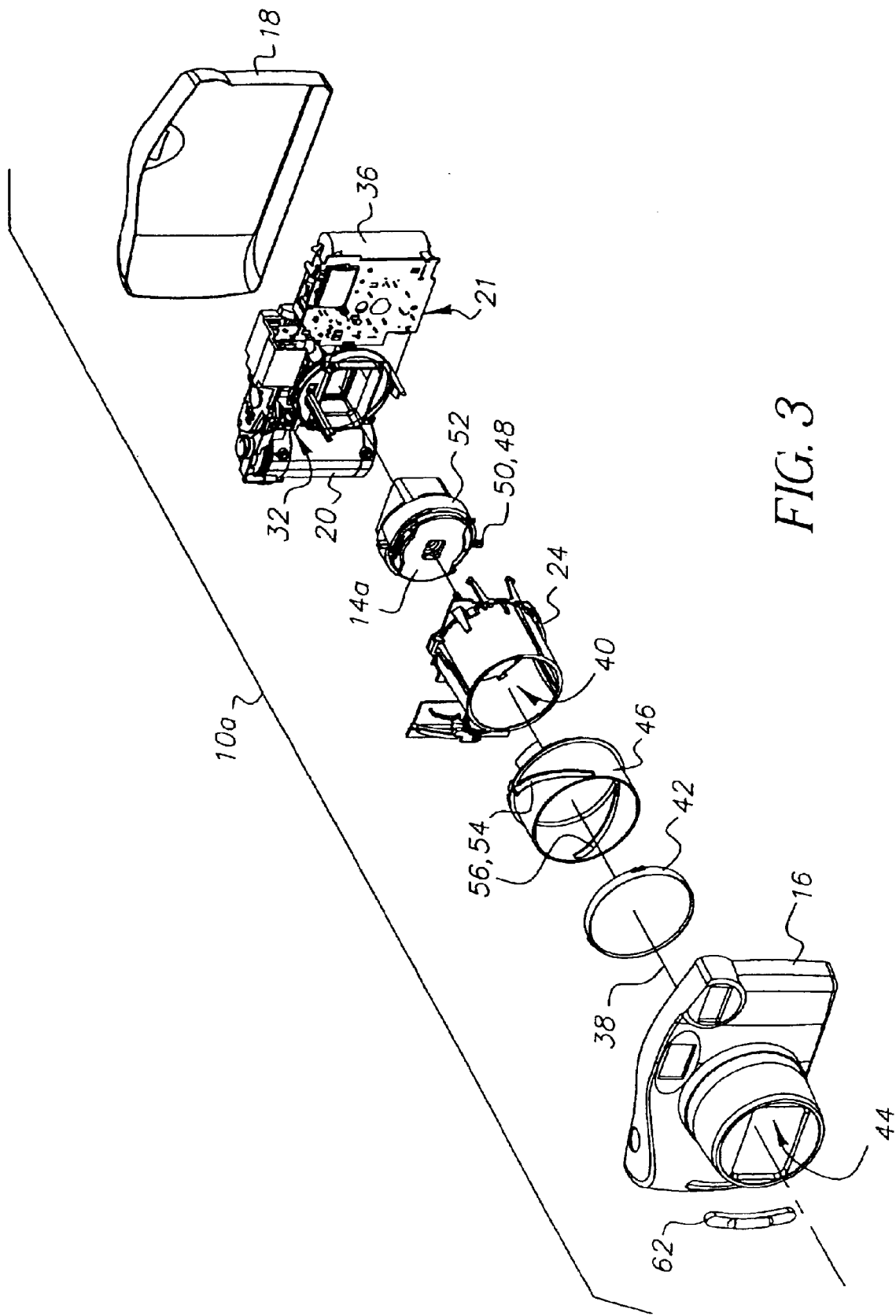
FIG. 3 is a partially exploded, front perspective view of the camera of FIG. 1.
Figure 4:
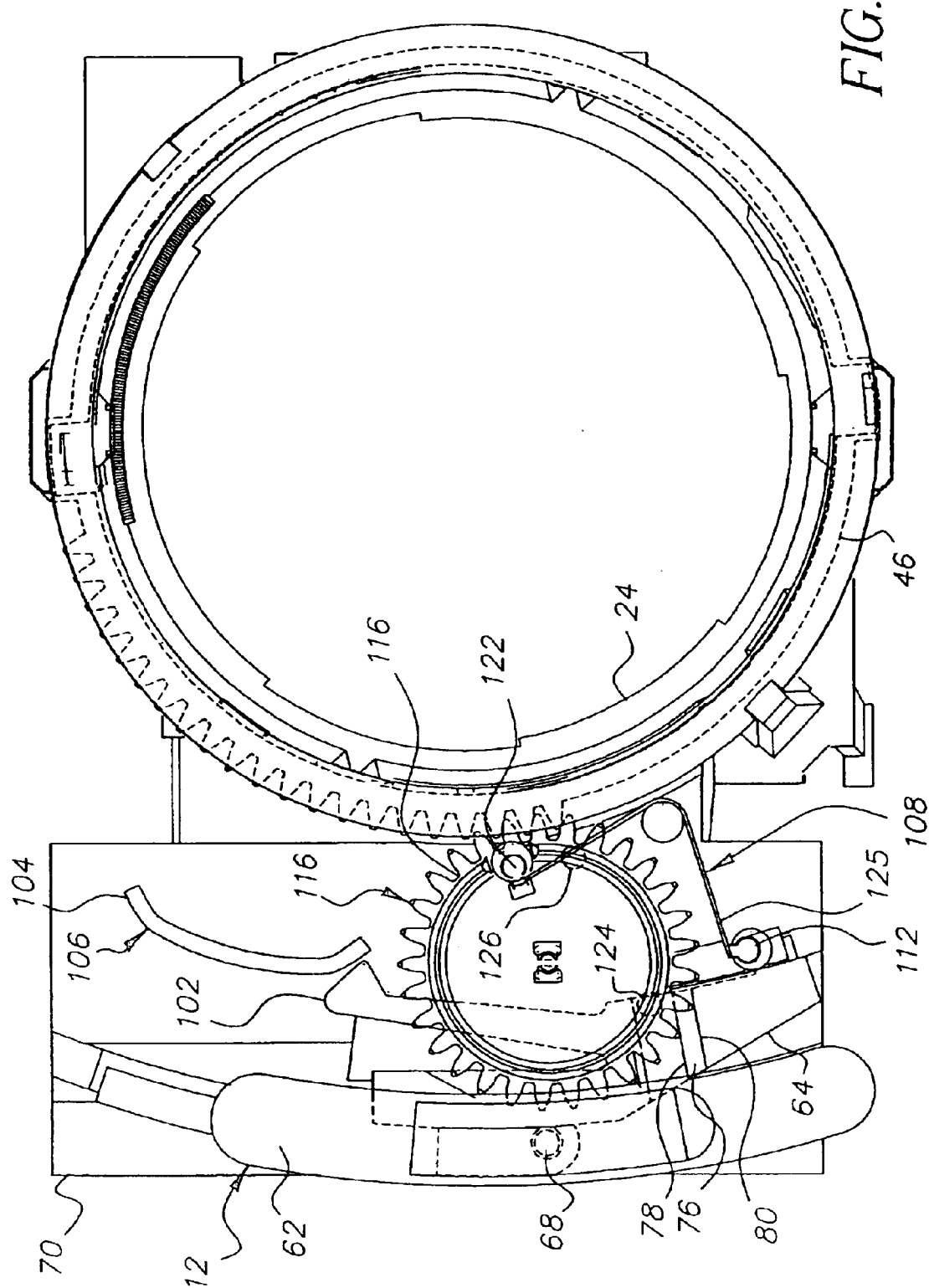
FIG. 4 is a front view of the actuator base, support, and twist ring of the camera of FIG. 1. The twist ring is shown in a wide angle position.
Figure 5:
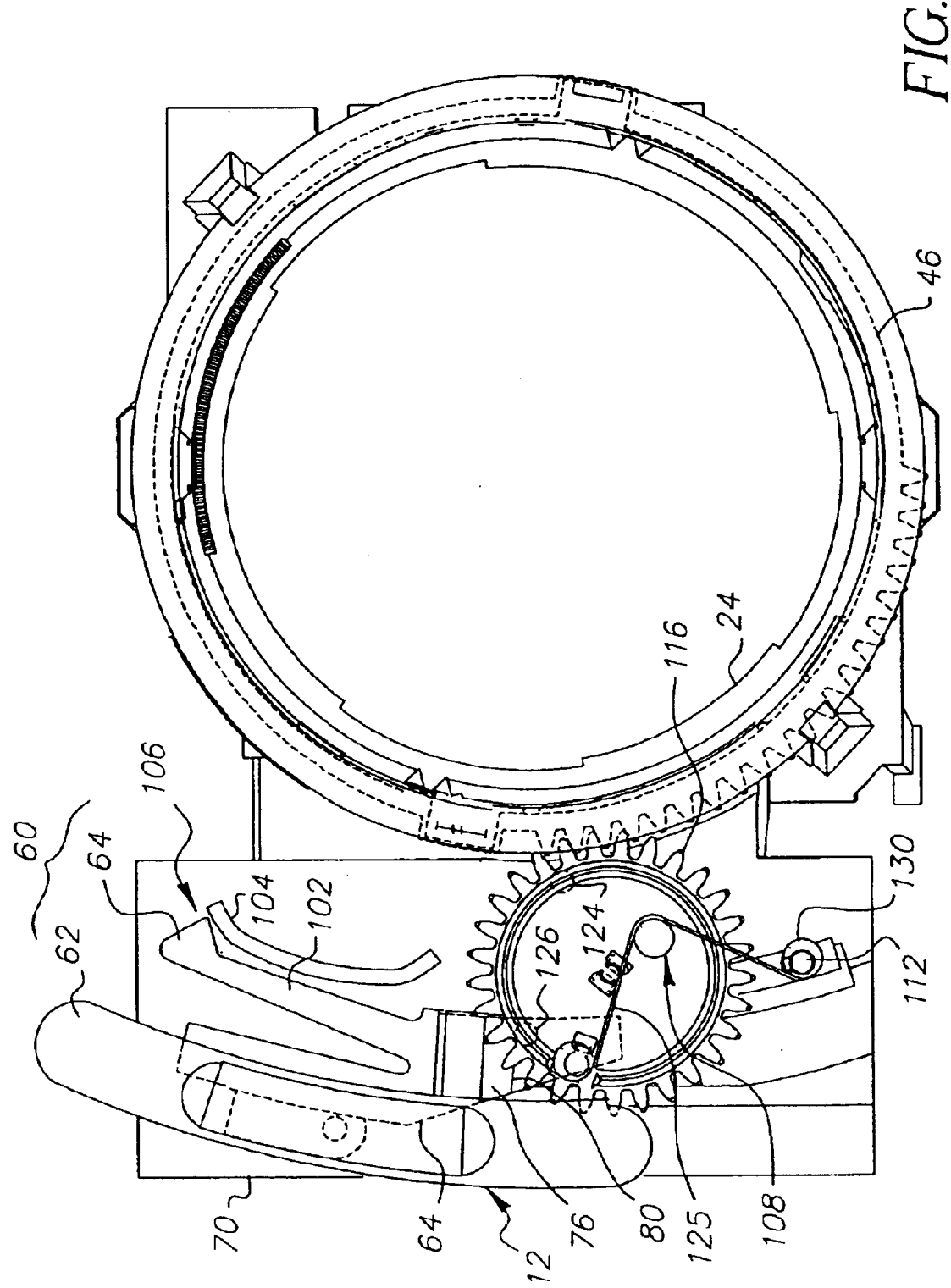
FIG. 5 is a is the same view as FIG. 4, but the twist ring is shown in the telephoto position.
Figure 6:
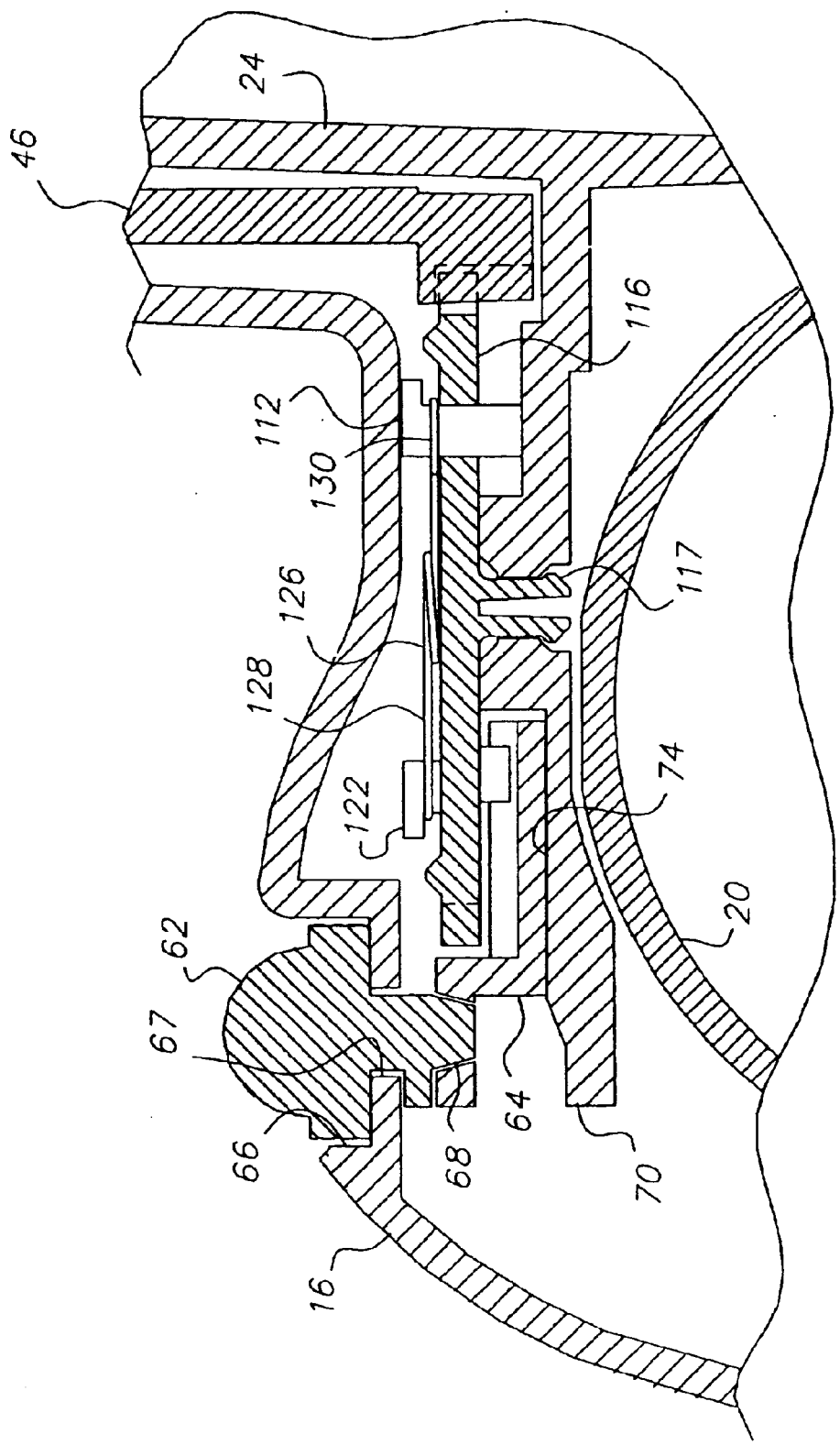
FIG. 6 is a partial cross-sectional view of the deployment apparatus of FIG. 1. The twist ring is in the telephoto position.
Figure 7:
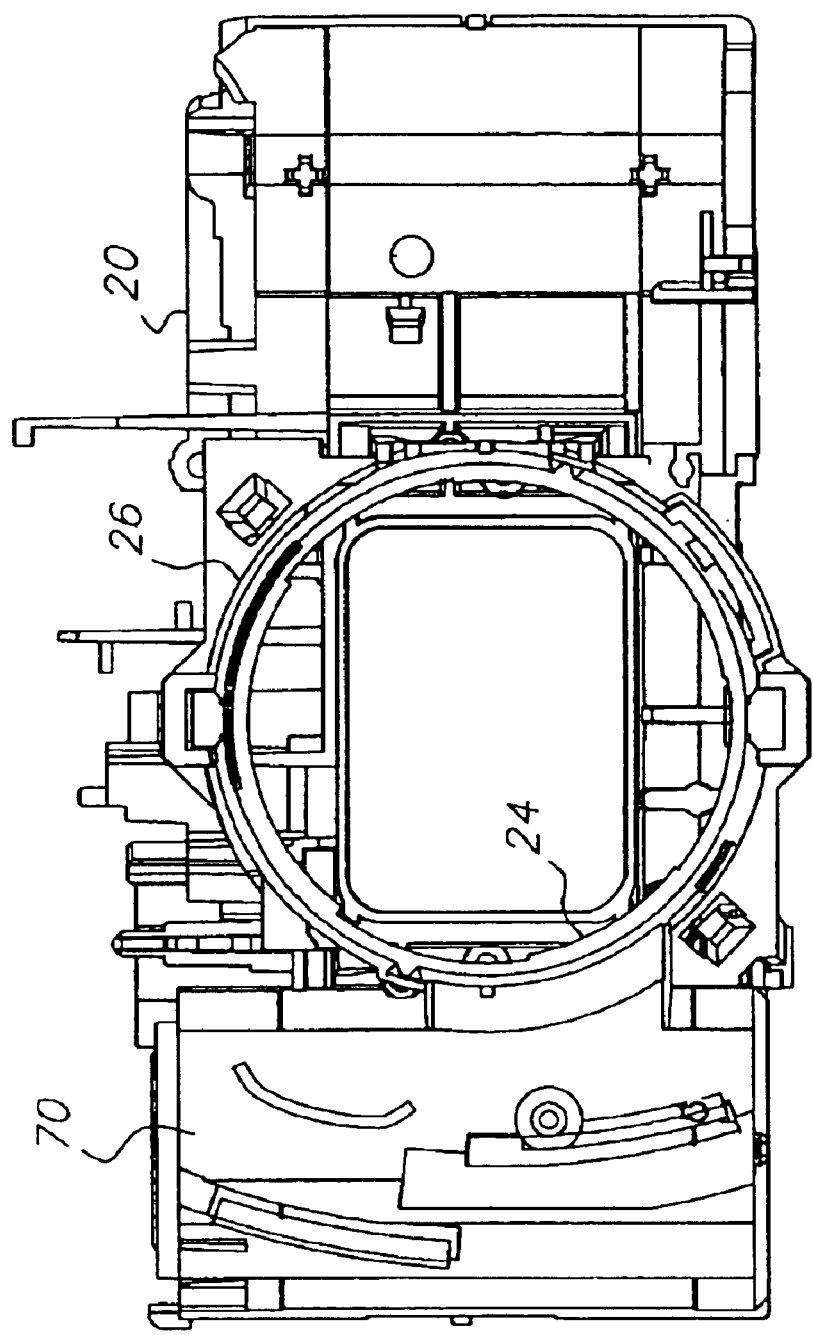
FIG. 7 is a front view of the camera frame, support, and actuator base of the camera of FIG. 1.
Figure 8:
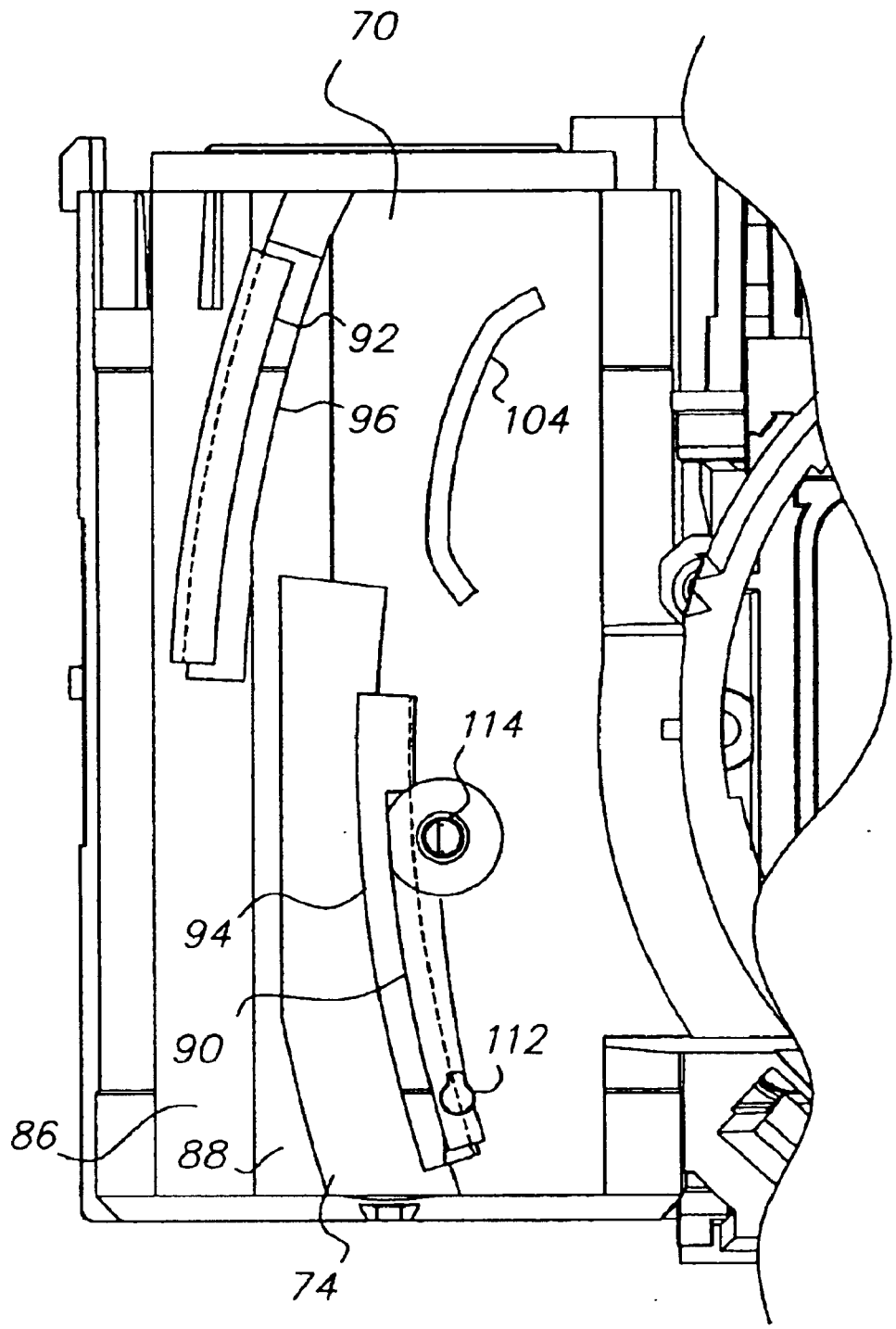
FIG. 8 is a partial enlargement of the view of FIG. 7, showing the actuator base.
Figure 9:
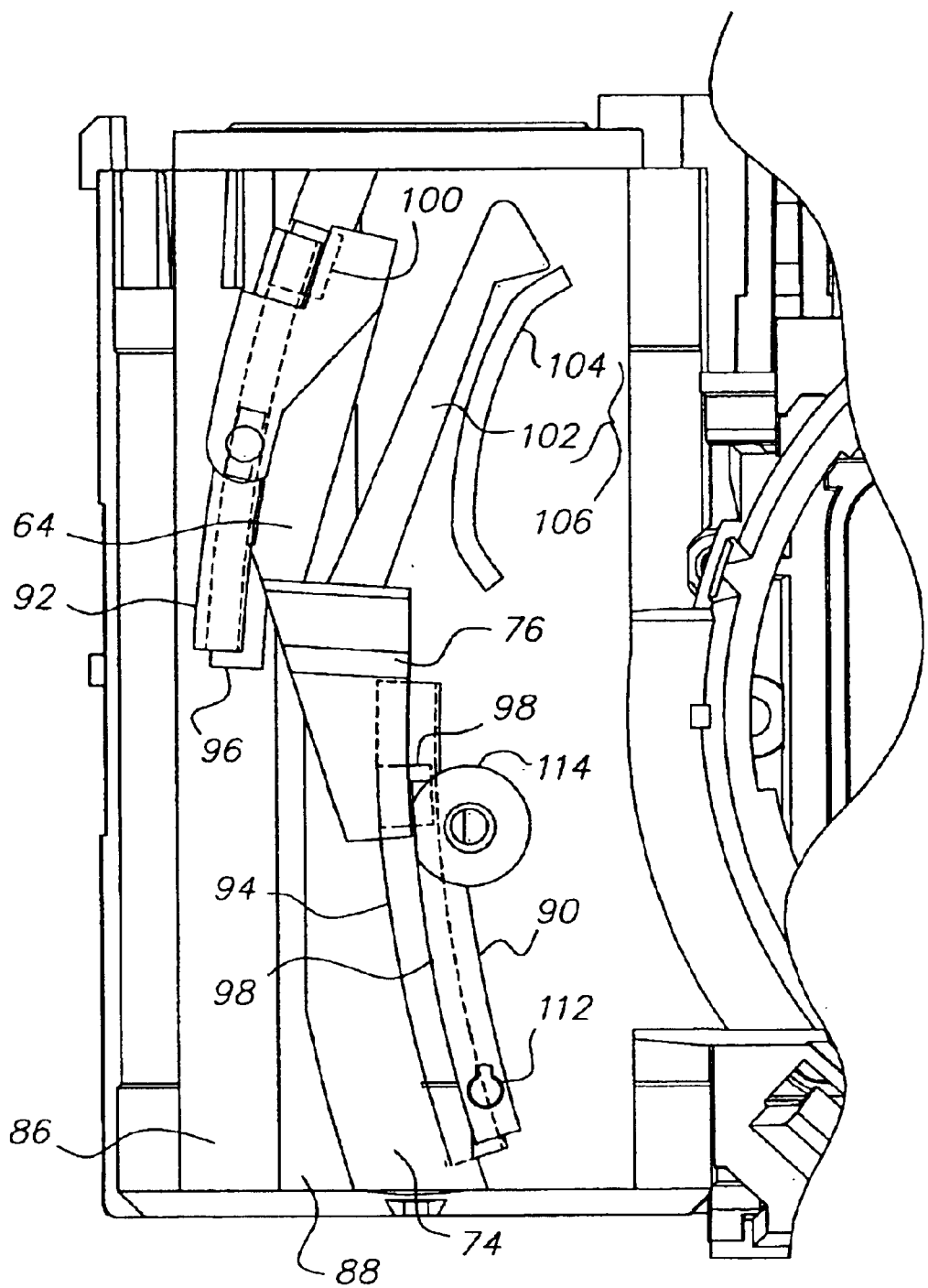
FIG. 9 is the same view as FIG. 8, except that the inner subunit of the actuator is also shown.
Figure 11:
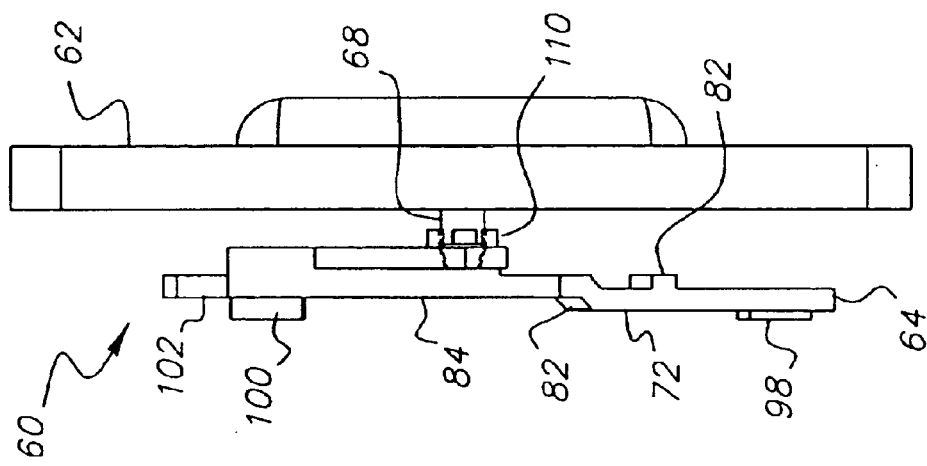
Figure 10:
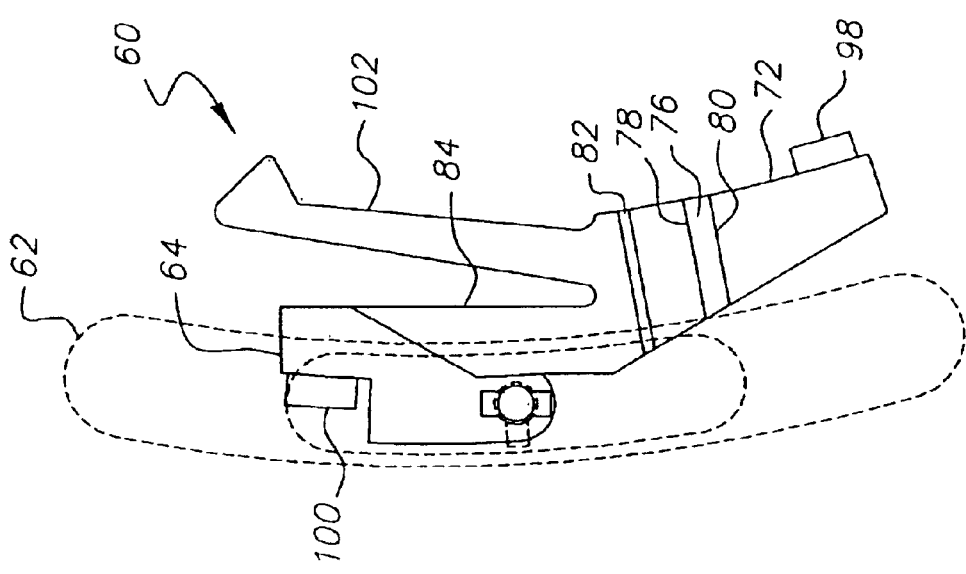
FIG. 10 is a front view of the actuator of the camera of FIG. 1.

FIG. 11 is a side view of the actuator of the camera of FIG. 1.

Figure 12:
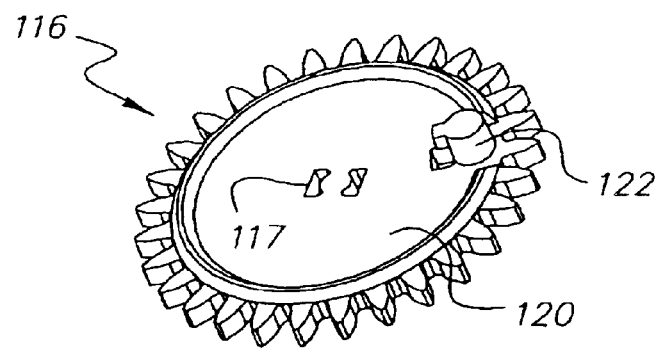

FIG. 12 is a perspective view of the drive unit of the camera of FIG. 1.

Figure 13:
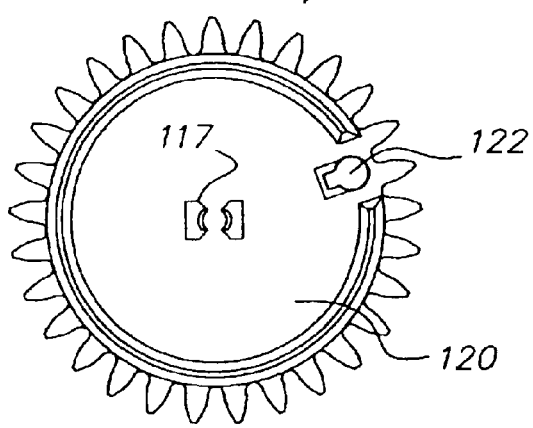

FIG. 13 is a front view of the drive unit of FIG. 12.

Figure 14:
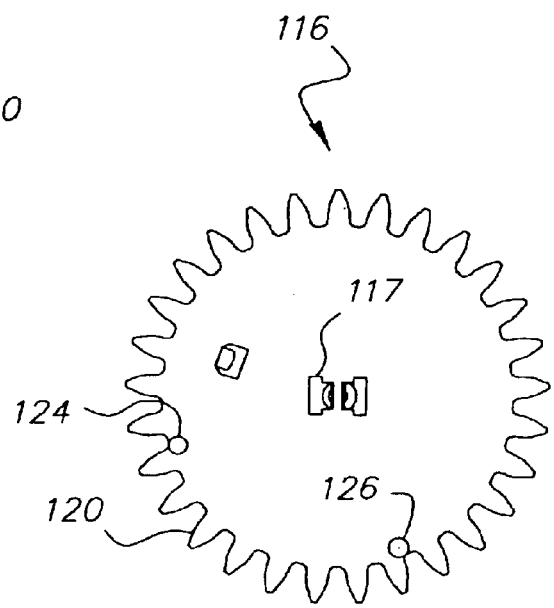

FIG. 14 is a rear view of the drive unit of FIG. 12.

Figure 15:
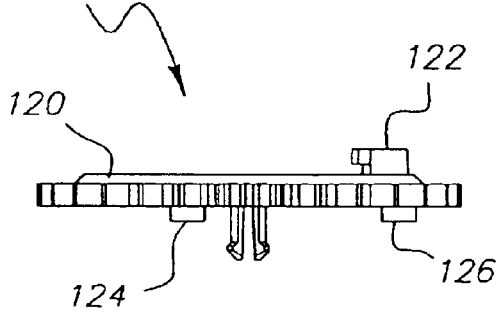

FIG. 15 is a bottom view of the drive unit of FIG. 12.

Figure 16:
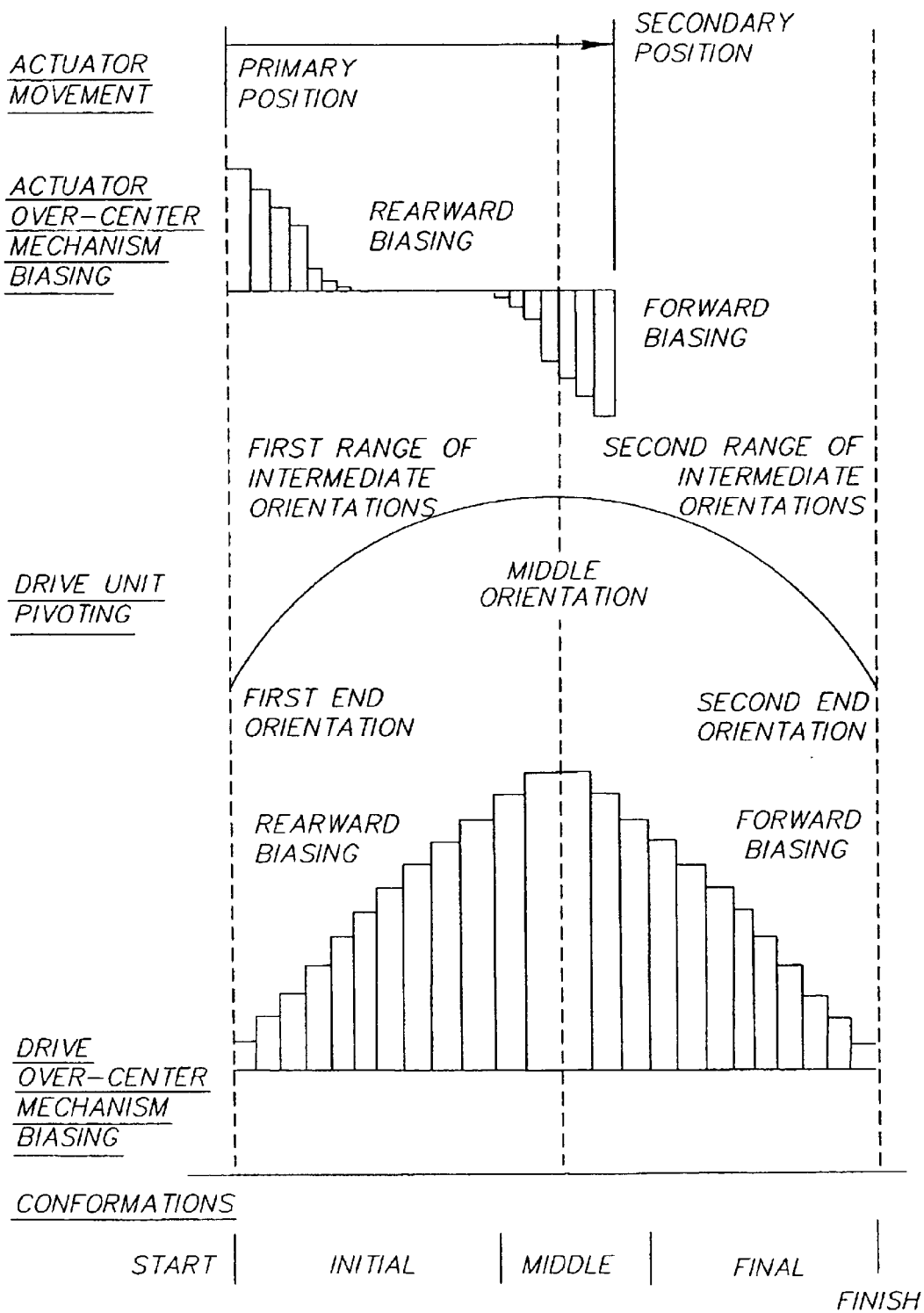

FIG. 16 is a timing diagram of the operation of the deployment apparatus.

Figure 17:
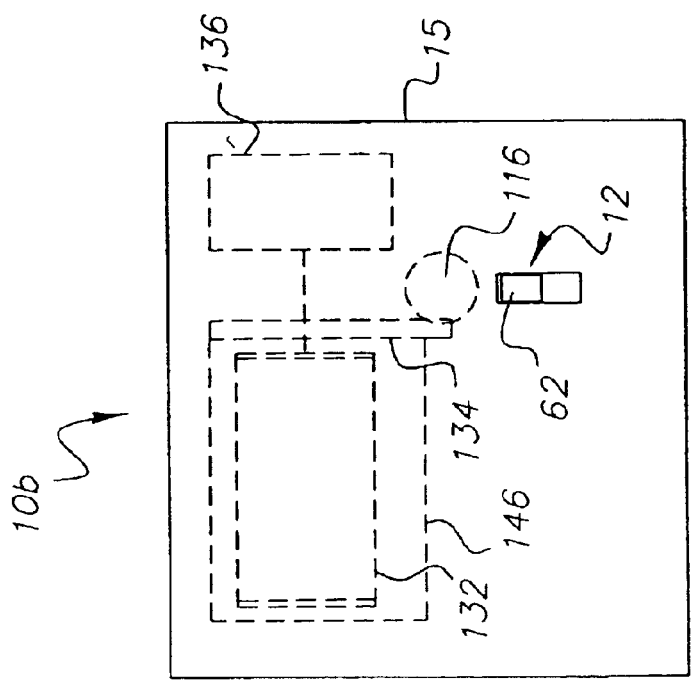

FIG. 17 is a front view of another embodiment of a hand-held device that includes the deployment apparatus. A deployable door is shown in a closed position.

Figure 18:
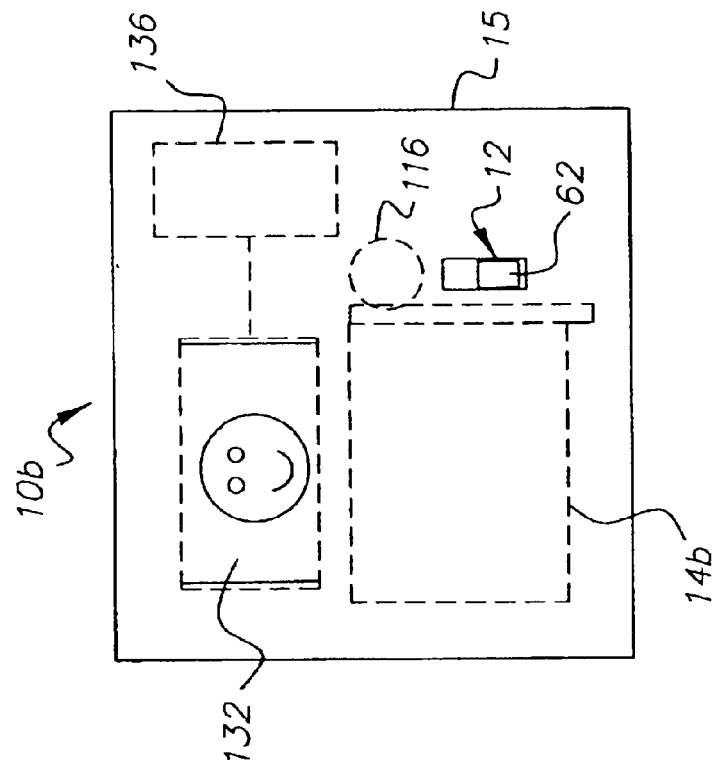

FIG. 18 is the same view as FIG. 17, but the deployable door is shown in an open position.

DETAILED DESCRIPTION OF THE INVENTION

The cameras 10a and other hand-held devices 10b described here have a deployment apparatus 12 that is used to move a deployable member 14, such as a lens barrel 14a or door 14b. The camera 10a or other hand-held device 10b has a body 15. The deployable member 14 is mounted to the body 15 and movable between an undeployed position and a deployed position.

The nature of the positions is a function of the nature of the deployable member. The deployable member 14 may be exposed to the outside environment in one or both positions or may be fully internal to the body 15. For example, in the embodiment shown in FIGS. 1–15, the undeployed position is a wide angle position of a taking lens of the camera 10a. The deployed position is a telephoto position of the taking lens. The taking lens is located internal to the camera 10a in both positions.

The deployment apparatus 12 has a snap-action that propels the deployable member into the deployed and undeployed positions, in alternation. With manual operation, this helps deter positioning between the deployed and undeployed positions. This is desirable with two-position lenses, lens covers, and the like. The snap-action also makes available a greater extent of travel of the deployable member than of an actuator 60 that is moved by the user. This is useful in cameras 10a and other hand-held devices 10b, in which compactness is important and available space for mechanical features is limited. In particular embodiments described herein, the operator of the deployment apparatus 12 also has a drive unit that decouples from the actuator 60, during the completion of the deployment of the deployable member into the deployed and undeployed positions. This feature can protect a relatively delicate deployable member from the effects of excessive travel.

The movement of the deployable member 14 can be a rotation or can be a translation along a longitudinal axis or can combine both types of movement. The invention is generally described herein in relation to embodiments, in which the deployable member 14 is a lens barrel 14a that is rotated between two different positions by the deployment apparatus 12. Like considerations apply to other kinds of deployable members, such as lens covers, flash housings, and doors and covers; and to other hand-held devices such as a personal digital assistants, cellular telephones, music players, and the like.

In the embodiments described herein, the deployment apparatus 12 is powered by the user. This approach is particularly advantageous, but is not limiting. The deployment apparatus 12 can be powered by a motor (not shown).

Referring now to the embodiment of FIGS. 1–15, body 15 includes separable front and rear covers 16,18 that enclose a frame assembly 21. The frame assembly 21 includes a frame 20 to which a number of other camera components are attached. One of those components is a lens module 22, which includes a support 24 that is joined to the frame 20.

The support 24 has a mount 26 and a guide 28 that is joined to the mount 26. The support 24 can be permanently attached to the frame 20 or can be reversibly removable. The latter is convenient for the recycling of one-use-time cameras. The manner of attachment is not critical. The support 24 can be hooked to the frame 20 by hooks 30 and matching holdfasts (not shown). Other types of fasteners can also be used. The support 24 can also be adhered to the frame 20, or held by friction fit, or by some other means. The frame 20 and support 24 or frame 20 and mount 26 can be made as a one-piece plastic casting, if desired, or can each be a one-piece plastic casting.

The camera 10 includes a capture unit 32 that captures and stores images. The type of capture unit 32 used is not critical. The capture unit 32 can capture images on photographic film. In that case, it is convenient if the frame 20 has a pair of opposed chambers (not separately identified in the figures). Film is wound from chamber to chamber across a capture plane (not shown). Film related features (not shown), such as a film transport, can be provided in a manner well known to those of skill in the art.

With an electronic capture unit, the photographic film is replaced by an electronic imager (not shown). The imager is controlled by a control system that includes electronic memory. Captured images are stored in memory and can be manipulated by the control system. Features of such electronic capture units are well known to those of skill in the art.

A flash unit 36 and other camera components, well known to those of skill in the art, can also be included in the camera 10. The flash unit 36 and other components are mounted to the frame 20 or held between the frame 20 and the covers 16,18.

The support 24 defines an optical axis 38. The guide 28 extends forward from the mount 26 along the optical axis 38 and encircles a central passage 40 aligned with the optical axis 38. The term "encircles" and like terms are used in a broad sense that does not imply and is not limited to circular shapes, nor to structures without gaps or openings. In the embodiments discussed herein, the central passage 40 is generally circular in cross-section. It will be understood that like considerations apply to embodiments having like features of other shapes.

The lens barrel 14a is reversibly movable along the central passage 40, in alignment with the optical axis 38, from a retracted position, through a plurality of intermediate positions, to an extended position. The lens barrel 14a can be disposed fully within the guide 28 in extended and retracted positions of the lens barrel 14a can protrude from the guide 28 in the extended position or in both extended and retracted positions. The invention is generally described herein in relation to an embodiment in which the lens barrel 14a is disposed completely within the guide 28, in the extended and retracted positions. The front cover 16 encloses the guide 28, except at a cover opening 44 aligned with the optical axis 38. The cover opening 44 can be covered by a transparent or filtering cover glass 42.

The lens barrel 14a can, alternatively, protrude from the guide 28 in the extended position or in both extended and retracted positions. In this case, the margin of the opening 44 in the front cover 16, encircles the lens barrel 14a (not shown).

A twist ring 46 is mounted on the guide 28. The twist ring 46 encircles the guide 28 or extends at least part of the way around the guide 28. The twist ring 46 mechanically engages the lens barrel 14a, such that rotation of the twist ring 46 moves the lens barrel 14a along the optical axis 38 between the extended and retracted positions. The twist ring 46 is trapped in place axially by the front cover 16 or other parts.

In FIGS. 1–15, the mechanical coupling between the twist ring 46 and the lens barrel 14a is a cam-type extension-retraction mechanism. The lens barrel 14a includes a tracker 48 that has a pair or opposed track followers 50 that extend outward relative to a main portion 52 of the lens barrel 14a. The twist ring 46 has a tracking portion 54 that receives the track followers 50 of the lens barrel 14a and constrains the lens barrel 14a, such that the lens barrel 14a moves forward and backward along the optical axis 38 when the twist ring 46 is rotated between the rightward and leftward configurations.

The tracking portion 54 of the twist ring 46 is a set of internal tracks 56 that spiral about the optical axis 38. Each track 56 receives a respective one of the track followers 50. In the illustrated embodiments, the tracks 56 are spiral slots that extend toward the optical axis 38 from the circumferential wall of the twist ring 66. The track followers 50 are pins that extend through respective tracks 56. Alternatively, tracks 56 can be pairs of parallel fences that receive track followers 50 configured to ride between the fences. The extension-retraction mechanism features of the lens barrel 50 and twist ring 46 also can be interchanged, for example, the track followers 50 can be provided on the twist ring 46 rather than the lens barrel 14a.

The track followers 50 extend to the tracks 56 through corresponding slots 58 in the guide 28. The slots 58 each extend parallel to the optical axis 38. In illustrated embodiments, there are two slots 58 and two tracks 56. The track followers 50 slide along the tracks 56 when the twist ring 46 is rotated. Since the track followers 50 are held by the slots 58 of the support 24, this results in the lens barrel 14a traversing linearly inward or outward along the optical axis 38.

Other types of extension-retraction mechanism can be used. For example, the twist ring 46 and lens barrel 50 can be linked by a gear train, pins that ride in cam slots or grooves, or the like.

The lens barrel 14a telescopes inward and outward with rotation of the twist ring 46. A taking lens system (not separately illustrated) in the lens barrel 14a is set for a wide angle view when the twist ring and and lens barrel 14a are in the undeployed position. The taking lens system is set for a telephoto view when the twist ring and lens barrel 14a are in the deployed position. The lens barrel 14a and twist ring are switchable between the two positions by manual movement of an actuator 60.

The actuator 60 of the deployment apparatus 12 has a grip 62 and a slide 64. The grip 62 is accessible from the outside of the body 15 and can include a raised handhold (as shown) and/or one or more features for easier manipulation by the user, such as knurling or other texturing. The grip 62 is movable back and forth within a recess 66 in the front cover 16. The grip 62 has a connector 68 that protrudes through an opening 67 in the recess 66. In the embodiment of FIGS. 1–15, the opening is centered within the recess 66 and is fully overlapped by the grip 62. This provides light locking and deters entry of dirt and debris. The travel of the grip 62 is limited by the length of the recess 66. Travel can be limited by the length of the opening within the recess 66, but this may be esthetically unappealing, in that the fit of the grip 62 in the cover may look sloppy to the user.

The actuator 60 is disposed against an actuator base 70 that adjoins the guide 28 of the lens module 22. The actuator base 70 can be part of the frame 20, or a separate piece, or integral with the guide 28 or mount 26 of the support 24. For example, the actuator base 70 and guide 28 can be parts of a one-piece plastic casting. This is convenient in that the alignment of the deployment apparatus 12 with the lens barrel 14a is, to a large extent, a function of the physical positioning of the actuator base 70 alongside the guide 28. In particular embodiments, the guide 28 is hooked to the mount 26 and the actuator base 70 and mount 26 are both hooked to the frame 20 to reduce the risk of flexure of one part relative to another during use.

The slide 64 of the actuator 60 rests against the actuator base 70 and is movable reciprocally on the actuator base 70. The slide 64 can have a stepped shape (see FIG. 1), in which a lower step 72 rides in a trough 74 in the actuator base 70. A rib 76 extends outward from the lower step 72. The rib 76 extends transverse to the direction of movement of the actuator 60. The rib 76 has a pair of opposed faces 78,80. A transition 82 adjoins the lower step 72 and slopes upward to an upper step 84. The upper step 84 rides against a shelf 86 of the actuator base 70. The shelf 86 and trough 74 are flat where the slide 64 is in contact, but could be modified to reduce friction. The region 88 of the actuator base 70 between the trough 74 and the shelf 86 is cut away to provide clearance for the transition.

The actuator base 70 includes a pair of flanges 90,92. (See FIGS. 7–9.) The first flange 90 overlaps a groove 94 adjoining the trough 74 in the actuator base 70. A similar groove 96 adjoins the sloped region 88 of the actuator base 70. The second flange 92 overlaps the second groove 96. The lower step 72 of the slide 64 has a tang 98 that is shaped so as to fit in the first groove 94. The upper step 84 of the slide 64 has a similar tang 100 that fits in the second groove 96. The end of the trough 74 is open and the slide 64 can flex slightly. This allows the slide 64 to be slid under the flanges 90,92 during assembly of the camera 10.

A pawl-arm 102 has a flexible arm that terminates in a pawl. The pawl-arm 102 is joined to the upper step 84 of the slide 64. A detent rib 104 protrudes outward from the actuator base 70. The pawl-arm 102 rides against the detent rib 104 and resiliently biases the actuator 60 toward the primary and secondary positions and away from intermediate positions between the primary and secondary positions. The pawl-arm 102 and detent rib 104 together provide an actuator over-center mechanism 106. This over-center mechanism 106 acts in concert with a second or drive over-center mechanism 108.

The upper step 84 of the slide 64 has a fitting 110 that receives the connector 68 of the grip 62. In the embodiment shown, the grip 62 is snap fit into a hole in the upper step 84 of the slide 64. This is convenient, because the grip 62 is held in place without the use of additional parts and the camera 10 is easy to assemble. Alternative approaches for attaching parts are well-known to those of skill in the art.

The actuator base 70 has an outwardly extending post 112 and a drive unit seat 114. The drive unit seat 114 and post 112 are offset from each other. A drive unit 116 is seated in the drive unit seat 114 and is pivotable about a drive axis 118 (shown in FIG. 1) that extends through the seat 114. The drive unit 116 and drive unit seat 114 can fit in the manner of a hub and axle; however, it is convenient to provide a snap fit, in which the drive unit seat 114 is a rimmed hole and the drive unit 116 has a snap connector 117, as shown in some of the figures.

The drive unit 116 has a gear wheel 120 having circumferential teeth. A post 122 extends upward near the periphery of the gear wheel 120. The drive unit 116 has a pair of downwardly extending stops 124,126 that extend downward from the gear wheel 120, near the periphery of the gear wheel 120. The post 122 and stops 124,126 can be radially positioned differently, but the peripheral position shown maximizes drive unit 116 movement, for a given gear wheel 120 size. The post 122 and stops 124,126 can be moved further out radially on extensions (not shown), but this may complicate assembly of the device. The gear wheel 120 overlaps the slide 64. This reduces space requirements of the deployment apparatus.

The stops 124,126 extend downward from the gear wheel 120, to an extent that the stops 124,126 can interfere with the rib 76 during movement of the actuator 60. The stops 124,126 are spaced apart from each other. This separation can be varied but is, desirably, greater than 180 degrees in the directions of travel of the drive unit 116. In the deployment apparatus shown in FIGS. 1–15, this separation of the stops 124,126 is 270 degrees in the direction of movement of the drive unit 116. Angles of less than 180 degrees can be used, but for a given travel of a deployable component, require use of a larger gear wheel 120. This decreases the compactness that is a benefit of the deployment apparatus described here.

In use, the gear wheel 120 does not have to have a complete circle of teeth. For example, in the embodiment of FIGS. 1–15, the teeth in the 90 degree arc between the two stops 124,126 are non-functional could be eliminated. A complete circle of teeth, although non-functional in the finished device, can be beneficial during assembly, since the drive unit 116 can be put in place in a random orientation and can then be rotated in either direction until a correct orientation is reached. The deployable component is then assembled with the drive unit 116 after the correct orientation has been reached.

The twist ring 46 is toothed to match the movement of the drive unit 116, that is, the teeth are complementary to the functional teeth of the drive unit 116.

In the embodiment of FIGS. 1–15, the drive over-center mechanism 108 is mounted to the actuator base 70 and the drive unit 116. The drive over-center mechanism 108 has an over-center spring 126 having a loop 128,130 at the end of each of two opposed arms. The first loop 128 is fitted over the post 122 of the drive unit 116. A second loop 130 is fitted over the post 112 of the actuator base 70. The over-center spring 126 biases the drive unit 116 and enmeshed twist ring 46, toward the nearer of the retracted and extended orientations and away from in-between orientations.

Other types of over-center mechanisms can be used in place of those disclosed here. For example, the pawl-arm 102 and detent rib 104 can be replaced by an over-center spring like the one illustrated. (Posts can be added to the actuator base 70 and slider to hold respective loops of the over-center spring.)

Timing relationships of the actuator 60, drive unit 116, and over-center mechanisms 106,108 during forward movement of the deployable member 14 to the deployed position are illustrated in FIG. 16. An equivalent diagram could be provided for the reverse movement by interchanging directional terms and "first" and "second". FIG. 16 illustrates a generalized deployment apparatus, but can be related to the the embodiment of FIGS. 1–15, by assigning the terms "first end orientation" and "primary position" to the drive unit orientation and actuator position shown in FIG. 4 and the terms "second end orientation" and "secondary position" to the drive unit orientation and actuator 60 position shown in FIG. 5. The "forward" direction is then from "first" toward "second" and the "rearward" direction from "second" toward "first".

FIG. 16 illustrates movement in a forward stroke from a start conformation, through initial, middle, and final ranges of conformations, to a finish conformation. In the start conformation, the actuator 60 is in the primary position and the drive unit 116 in the first end orientation. In the finish conformation, the actuator 60 is in the secondary position and the drive unit 116 is in the second end orientation. In both the start and finish conformations, the actuator over-center mechanism 106 opposes movement of the actuator 60 and the drive over-center mechanism 108 opposes movement of the drive unit 116.

The switching of the lens barrel 14a between retracted and extended positions begins with the user pushing the grip 62 of the actuator 60. This moves the actuator 60 out of the primary position and toward the secondary position.

To initially move the actuator 60, the user must overcome the biasing by the over-center mechanisms 106,108. The amount of biasing provided decreases for each over-center mechanism at a trip point, after which biasing is provided in the opposite direction. The term "effectively non-biasing" is used herein to refer to a level of biasing that is within a few multiples of the force required to overcome friction and more respective parts past each other. The over-center mechanisms discussed herein are effectively non-biasing at respective trip points, that is, when the force applied causes biasing by the over-center mechanism to reverse. An over-center spring, like the drive over-center mechanism shown in the drawings, abruptly transitions at the trip point. The pawl-arm 102 and detent rib 104 of the actuator over-center mechanism 106 transitions slowly.

While the actuator 60 moves away from the primary position, the first face 78 of the rib 76 of the actuator 60 pushes against the first stop 124 of the drive unit 116. This causes the drive unit 116 to pivot through the first range of intermediate orientations toward the middle orientation. This pivoting is opposed by the actuator over-center mechanism 106 and the drive over-center mechanism 108.

Movement of the actuator 60 continues until the middle range of conformations is reached. At this point, the biasing by the actuator over-center mechanism 106 changes over to biasing toward the secondary position. This forward biasing by the actuator over-center mechanism 106 is opposite in direction from the continuing biasing by the drive over-center mechanism 108.

When the middle orientation of the drive unit 116 is reached, the drive over-center mechanism 108 changes over and biases in a forward direction toward pivoting of the drive unit 116 to the second end orientation. At this point, biasing by both over-center mechanisms 106,108 is in the same direction. The actuator 60 continues to move until the secondary position is reached and the actuator 60 stops 124,126 moving. The drive unit 116 continues moving forward under the forward biasing of the drive over-center mechanism 108. The drive unit 116, in the illustrated embodiment, moves independently of the actuator 60 after the middle orientation is reached. This results in the first stop 124 of the drive unit 116 moving away from the first face 78 of the rib 76 of the actuator 60. The biasing of the drive over-center mechanism 108 pivots the drive unit 116 through the second range of intermediate orientations to the second end orientation. The actuator 60 remains in the secondary position. During the continued pivoting of the drive unit 116, the second stop 126 of the drive unit 116 comes around and reaches the second face 80 of the rib 76.

The movement of the actuator initially stores energy in the over-center mechanisms 106,108 and then releases that energy to pivot the drive unit 116 over a greater range than would be available with the actuator 60 simply pushing the drive unit 116. In the charging and discharging, the actuator over-center mechanism 106 levels off, to some extent, the effort required of the user in charging the drive over-center mechanism 108.

The over-center mechanisms 106,108 can be changed to modify timing and the effort required of the user at particular times. For example, the same kind of over-center spring 126 can be used in both over-center mechanisms. This would increase user effort during part of the initial range of conformations, but effort in the middle range would be reduced. The actuator over-center mechanism would, in effect, trip the drive over-center mechanism. The actuator over-center mechanism can also be modified to provide more biasing than the drive over-center mechanism. This would cause the actuator 60 to move with the drive unit 116 in middle conformations between the middle orientation of the drive unit 116 and the secondary position of the actuator 60.

The movement of the lens barrel between positions can be delimited by the stops or by both the stops and the support or other feature or by only the supporter other feature. In the first two cases, the stops engage the faces of the rib in limit positions. In the latter case, the stops are spaced from the rib in the limit positions.

FIGS. 17–18 illustrate another embodiment, in which the deployable component of the hand-held device 10b is a door 14b that opens and closes over a display 132, such as a liquid crystal display that can show images. A control system 136 operates the display 132 as needed, in a manner well known to those of skill in the art. The deployable door 14b is moved linearly by a deployment apparatus 12 that functions in the same manner as the one earlier described, with the exception that the toothed segment of the deployable member is in the form of a linear rack 134 attached to the door 14b.

The features of the invention can be modified to meet particular requirements. For example, a pivotable lens turret (not shown), located within the lens barrel can pivot between two positions in tandem with the movement of the lens barrel between retracted and extended positions.

The invention has been described in detail with particular reference to certain preferred embodiments thereof, but it will be understood that variations and modifications can be effected within the spirit and scope of the invention.

What is claimed is:

1. A hand-held device having a deployable component, said device comprising:

a body;

a deployable component mounted to said body, said deployable component being movable between opposed undeployed and deployed positions;

a drive unit disposed within said body, said drive unit engaging said deployable component, said drive unit being reversibly pivotable about a drive axis from a first end orientation, through a first range of intermediate orientations, then through a second range of intermediate orientations, to a second end orientation;

an actuator mounted to said body, said actuator being manually switchable, in a forward stroke from a primary position to a secondary position, and, in a rearward stroke from said secondary position to said primary position, said actuator at said forward stroke pivoting said drive unit from said first end orientation to an intermediate orientation in said second range, said actuator at said rearward stroke pivoting said drive unit from said second end orientation to an intermediate orientation in said first range;

a drive over-center mechanism biasing said drive unit to pivot from said intermediate orientations in said second range toward said second end orientation, when said actuator at said forward stroke has pivoted said drive unit and from said first end orientation to an intermediate orientation in said second range, and from said intermediate orientations in said first range toward said first end orientation, when said actuator at said rearward stroke has pivoted said drive unit and from said second end orientation to an intermediate orientation in said second range.

2. The device of claim 1 wherein said body isolates said deployable component from direct manual repositioning.

3. A camera having a deployable lens barrel, said camera comprising:

a body;

a deployable lens barrel mounted to said body and being movable between opposed undeployed and deployed positions;

a drive unit disposed within said body, said drive unit engaging said lens barrel and being reversibly pivotable about a drive axis from a first end orientation, through a first range of intermediate orientations, then through a second range of intermediate orientations, to a second end orientation;

an actuator mounted to said body, said actuator being manually switchable in a forward stroke from a primary position to a secondary position and being manually switchable in a rearward stroke from said secondary position to said primary position, said actuator at said forward stroke pivoting said drive unit from said first end orientation to an intermediate orientation in said second range, said actuator at said rearward stroke pivoting said drive unit from said second end orientation to an intermediate orientation in said first range; and a drive over-center mechanism biasing said drive unit to pivot from said intermediate orientations in said second range toward said second end orientation and from said intermediate orientations in said first range toward said first end orientation.

4. A hand-held device having a deployable component, said device comprising:

a body;

a deployable component mounted to said body, said deployable component being movable between opposed undeployed and deployed positions;

a drive unit disposed within said body, said drive unit engaging said deployable component and being reversibly pivotable about a drive axis from a first end orientation, through a first range of intermediate orientations, then through a second range of intermediate orientations, to a second end orientation, said drive unit having a drive disk engaging said deployable component and having opposed first and second stops joined to said drive disk;

an actuator mounted to said body, said actuator being manually switchable in a forward stroke from a primary position to a secondary position and being manually switchable in a rearward stroke from said secondary position to said primary position, said actuator at said forward stroke pivoting said drive unit from said first end orientation to an intermediate orientation in said second range, said actuator at said rearward stroke pivoting said drive unit from said second end orientation to an intermediate orientation in said first range; said actuator having grip disposed external to said body and a rib spaced from said grip, said rib having a first face engaging said first stop in said first end orientation and a second face engaging said second stop in said second end orientation and a drive over-center mechanism biasing said drive unit to pivot from said intermediate orientations in said second range toward said second end orientation and from said intermediate orientations in said first range toward said first end orientation.

5. A hand-held device having a deployable component, said device comprising:

a body;

a deployable component mounted to said body, said deployable component being movable between opposed undeployed and deployed positions;

a drive unit disposed within said body, said drive unit engaging said deployable component and being reversibly pivotable about a drive axis from a first end orientation, through a first range of intermediate orientations, then through a second range of intermediate orientations, to a second end orientation;

an actuator mounted to said body, said actuator being manually switchable in a forward stroke from a primary position to a secondary position and being manually switchable in a rearward stroke from said secondary position to said primary position, said actuator at said forward stroke pivoting said drive unit from said first end orientation to an intermediate orientation in said second range, said actuator at said rearward stroke pivoting said drive unit from said second end orientation to an intermediate orientation in said first range;

an actuator over-center mechanism biasing said actuator toward said primary position and said secondary position, in alternation, and away from a plurality of middle positions between said primary and secondary positions; and a drive over-center mechanism biasing said drive unit to pivot from said intermediate orientations in said second range toward said second end orientation and from said intermediate orientations in said first range toward said first end orientation.

6. The device of claim 5 wherein said drive unit is pivotable by said drive over-center mechanism, independent of said actuator, from one of said intermediate orientations in said second range toward said second end orientation and from one of said intermediate orientations in said first range toward said first end orientation.

7. The device of claim 6 wherein said drive unit has a drive disk engaging said deployable component and opposed first and second stops joined to said drive disk, said actuator has a grip disposed external to said body and a rib spaced from said grip, said rib having opposed first and second rib faces, said first rib face engaging said first stop in said first end orientation, said second rib face engaging said second stop in said second end orientation, and said stops are disengaged from said rib faces during said pivoting of said drive unit by said drive over-center mechanism.

8. The device of claim 5 wherein said drive and actuator over-center mechanisms each have a forward biasing state, a rearward biasing state, and a non-biasing neutral state between respective said forward biasing and rearward biasing states; and said actuator over-center mechanism is in one of respective said forward biasing and rearward biasing states, when said drive over-center mechanism is in the respective said neutral state.

9. The device of claim 4 wherein said first end orientation is more than 180 degrees from said second end orientation.

10. The device of claim 4 wherein said first end orientation is 270 degrees from said second end orientation.

11. The device of claim 4 wherein said stops extend outward from said drive disk in a direction parallel to said gear axis.

12. The device of claim 4 wherein said deployable component has a toothed segment and said drive disk is a gear meshed with said toothed segment.

13. The device of claim 12 wherein said toothed segment is arcuate and said deployable component is pivotable about an axis parallel to said drive axis.

14. The device of claim 12 wherein said toothed segment is straight.

15. The device of claim 1 wherein said actuator is constrained from movement, in a forward direction, beyond said secondary position and, in a rearward direction, beyond said primary position.

16. The device of claim 1 wherein said drive over-center mechanism is joined to said drive unit in radially spaced relation to said drive axis.

17. A hand-held device comprising:

a body;

a deployable component mounted to said body, said deployable component being movable between opposed first and second positions relative to an axis of movement extending through said body, said deployable component having a toothed segment;

a drive unit disposed within said body, said drive unit being pivotable about a drive axis, said drive unit having a drive disk engaging said deployable component, said drive unit having spaced apart first and second stops joined to said drive disk, said drive unit being reversibly pivotable about said drive axis from a first end orientation, through first and second ranges of intermediate orientations, to a second end orientation;

an actuator mounted to said body, said actuator selectively moving between primary and secondary positions, said actuator having a rib aligned with said stops, said rib having opposed first and second rib faces, said first rib face engaging said first stop during said moving of said actuator from said primary position to said secondary position, said second rib face engaging said second stop during said moving of said actuator from said secondary position to said primary position;

a drive over-center mechanism biasing said drive unit to pivot from said intermediate orientations in said second range to said second end orientation and from said intermediate orientations in said first range to said first end orientation.

18. The device of claim 17 wherein said actuator, in moving from said primary position to said secondary position, pivots said drive unit from said first end orientation to an intermediate orientation in said second range, and said actuator, in moving from said secondary position to said primary position, pivots said drive unit from said second end orientation to an intermediate orientation in said first range.

19. A method for positioning a deployable component comprising the steps of:

accepting manual movement of an actuator from a primary position to a secondary position;

responsive to said movement from said primary to said secondary position, pivoting a drive unit from a first end orientation to one of a second range of intermediate orientations, said drive unit being pivotable from said first end orientation, through a first range and then said second range of intermediate orientations, to a second end orientation;

then, resiliently pivoting said drive unit from said one of said second range of intermediate orientations to said second end orientation, said resiliently pivoting step including releasing energy stored in a first over-center mechanism;

charging said first over-center mechanism during said movement of said actuator; and moving said deployable component with said drive unit, during said pivoting steps.

20. The method of claim 19 further comprising charging and then discharging a second over-center mechanism during said movement of actuator.

21. The method of claim 20 wherein said first over-center mechanism acts directly on said drive unit and said second over-center mechanism acts directly on said actuator.

22. The method of claim 19 further comprising:

accepting manual movement of said actuator from said secondary position to said primary position;

responsive to said movement from said secondary to said primary position, pivoting a drive unit from said second end orientation to one of said intermediate orientations in said first range;

then, resiliently pivoting said drive unit from said one of said first range of intermediate orientations to said first end orientation.

23. A deployment apparatus comprising:

a drive unit being reversibly pivotable about a drive axis from a first end orientation, through a first range of intermediate orientations, then through a second range of intermediate orientations, to a second end orientation;

an actuator mounted to said body, said actuator being manually switchable, in a forward stroke from a primary position to a secondary position, and, in a rearward stroke from said secondary position to said primary position, said actuator at said forward stroke pivoting said drive unit from said first end orientation to an intermediate orientation in said second range, said actuator at said rearward stroke pivoting said drive unit from said second end orientation to an intermediate orientation in said first range;

a drive over-center mechanism biasing said drive unit to pivot from said intermediate orientations in said second range toward said second end orientation and from said intermediate orientations in said first range toward said first end orientation; and an actuator over-center mechanism biasing said actuator toward said primary position and said secondary position, in alternation, and away from a plurality of middle positions between said primary and secondary positions.

24. The apparatus of claim 23 wherein said over-center mechanisms each have a forward biasing state, a rearward biasing state, and a non-biasing neutral state between respective said forward biasing and rearward biasing states; and said actuator over-center mechanism is in one of respective said forward biasing and rearward biasing states, when said drive over-center mechanism is in the respective said neutral state.

* * * * *